May 18, 1926.

H. D. LATHROP

BOTTLE WASHING MACHINE

Filed May 31, 1921

1,585,392

8 Sheets-Sheet 1

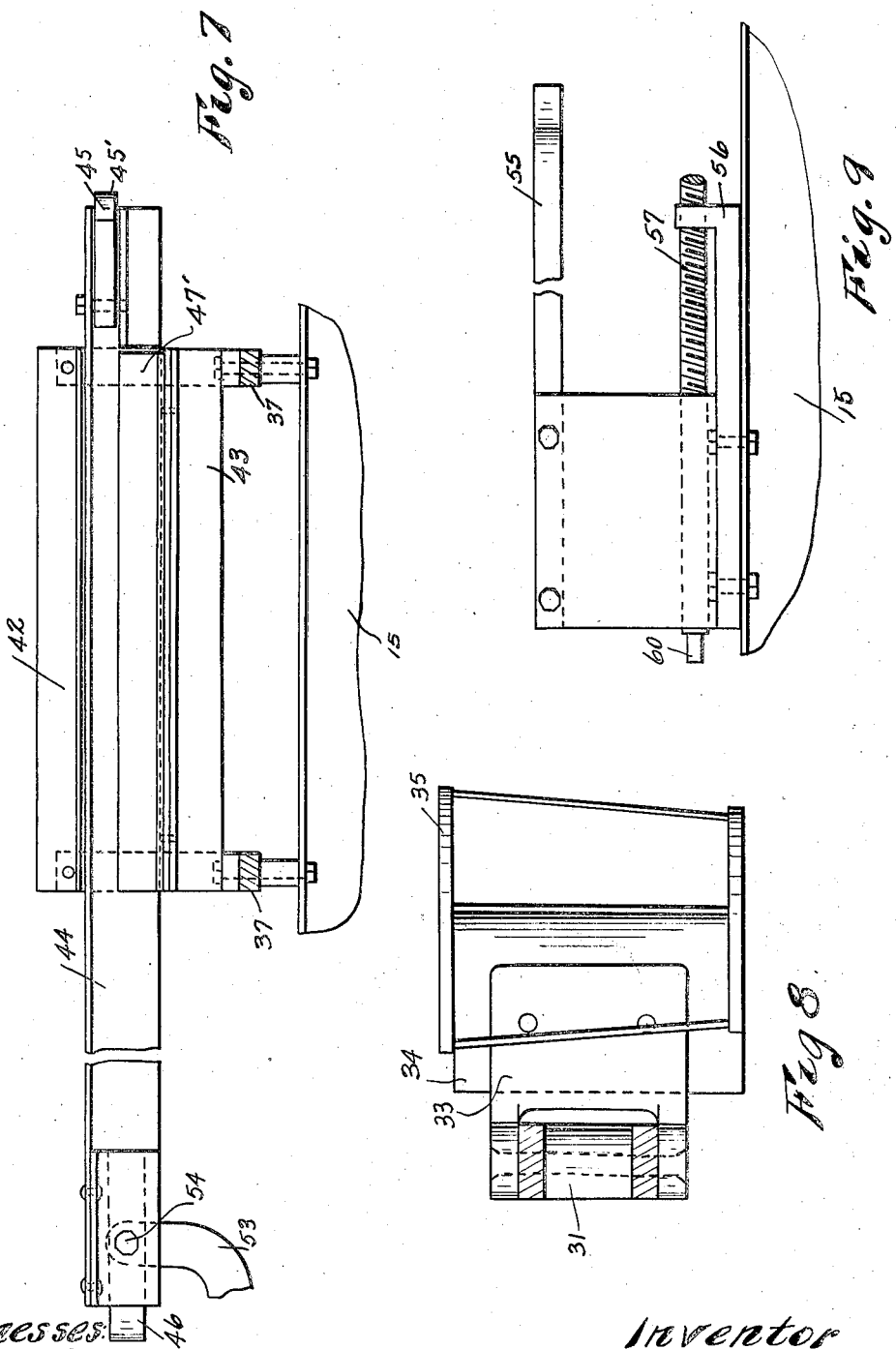

May 18, 1926. 1,585,392
H. D. LATHROP
BOTTLE WASHING MACHINE
Filed May 31, 1921 8 Sheets-Sheet 8
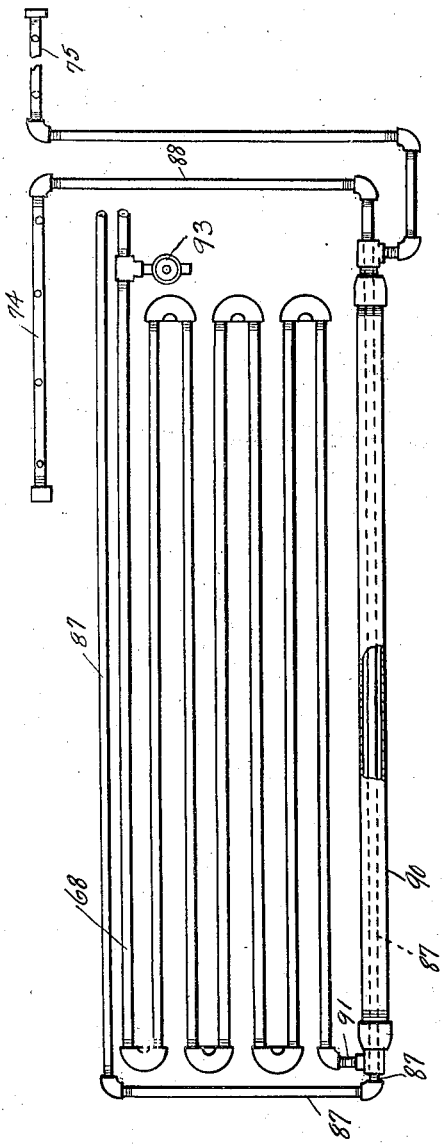
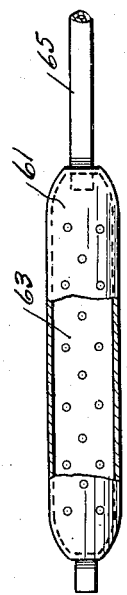
Witnesses:
C. E. Sheedy
Freda C. Appleton
Inventor:
Harry D. Lathrop
By Joshua R. H. Potts
His Attorney Patented May 18, 1926.

1,585,392

UNITED STATES PATENT OFFICE.

HARRY D. LATHROP, OF CHICAGO, ILLINOIS.

BOTTLE-WASHING MACHINE.

Application filed May 31, 1921. Serial No. 473,677.

My invention relates to bottle washing machines especially designed for washing milk bottles or the like and has for its principal object the provision of a bottle conveyor, travelling in a horizontal plane, whereby the bottles carried on the said conveyor pass under and over pipes discharging different washing fluids, thoroughly washing the said bottles before removal from the said conveyor.

A further object of my invention is the provision for manually intermittently operating a bottle conveyor requiring but one operator to operate the device thus saving the expense of labor.

A further object of my invention is the provision of a device of this character which will be highly efficient in use and economical in structure.

Other objects will appear hereinafter.

The invention consists in the combinations and arrangements of parts hereinafter described and claimed.

Figure 1:
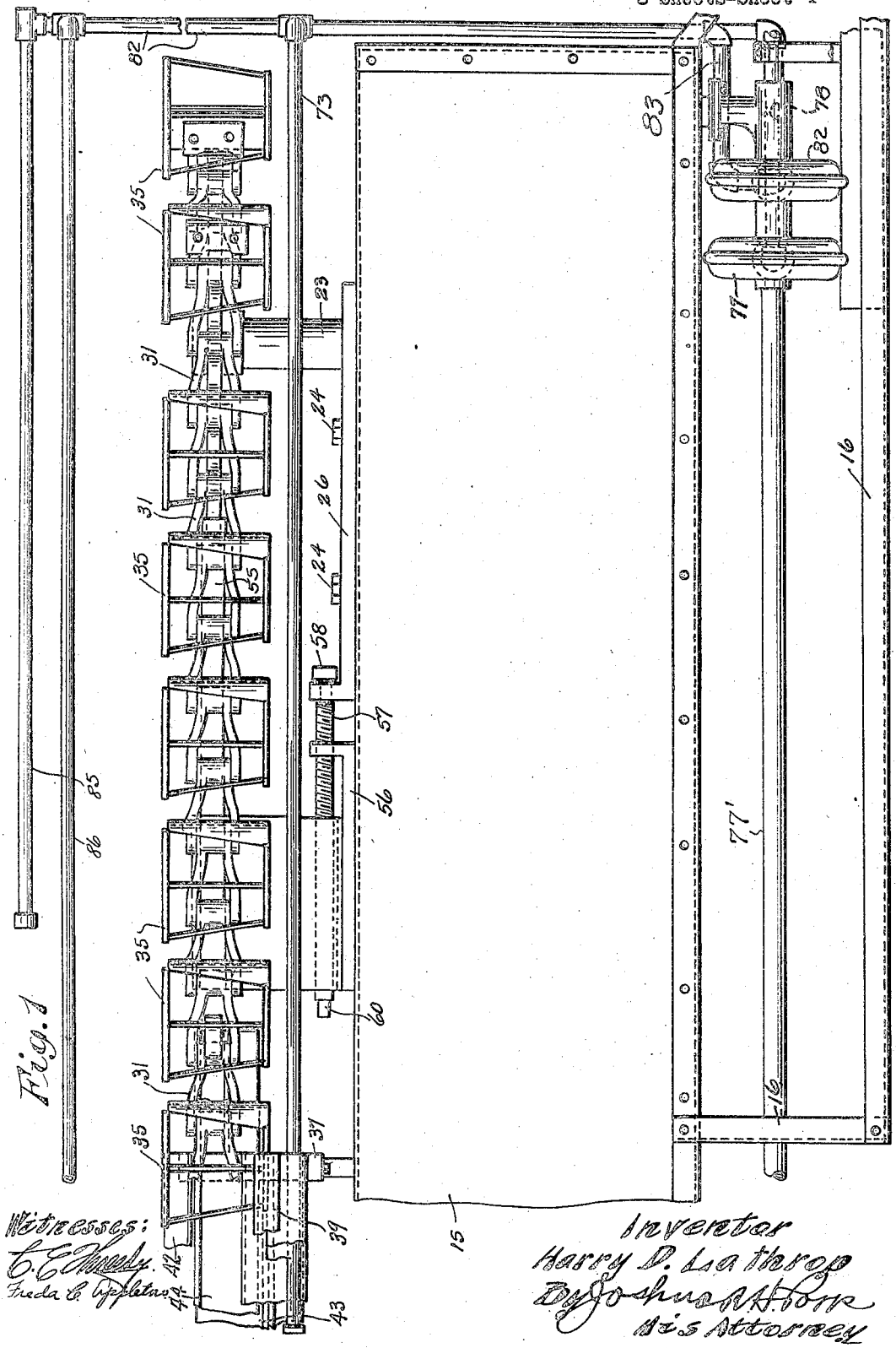
Figure 2:
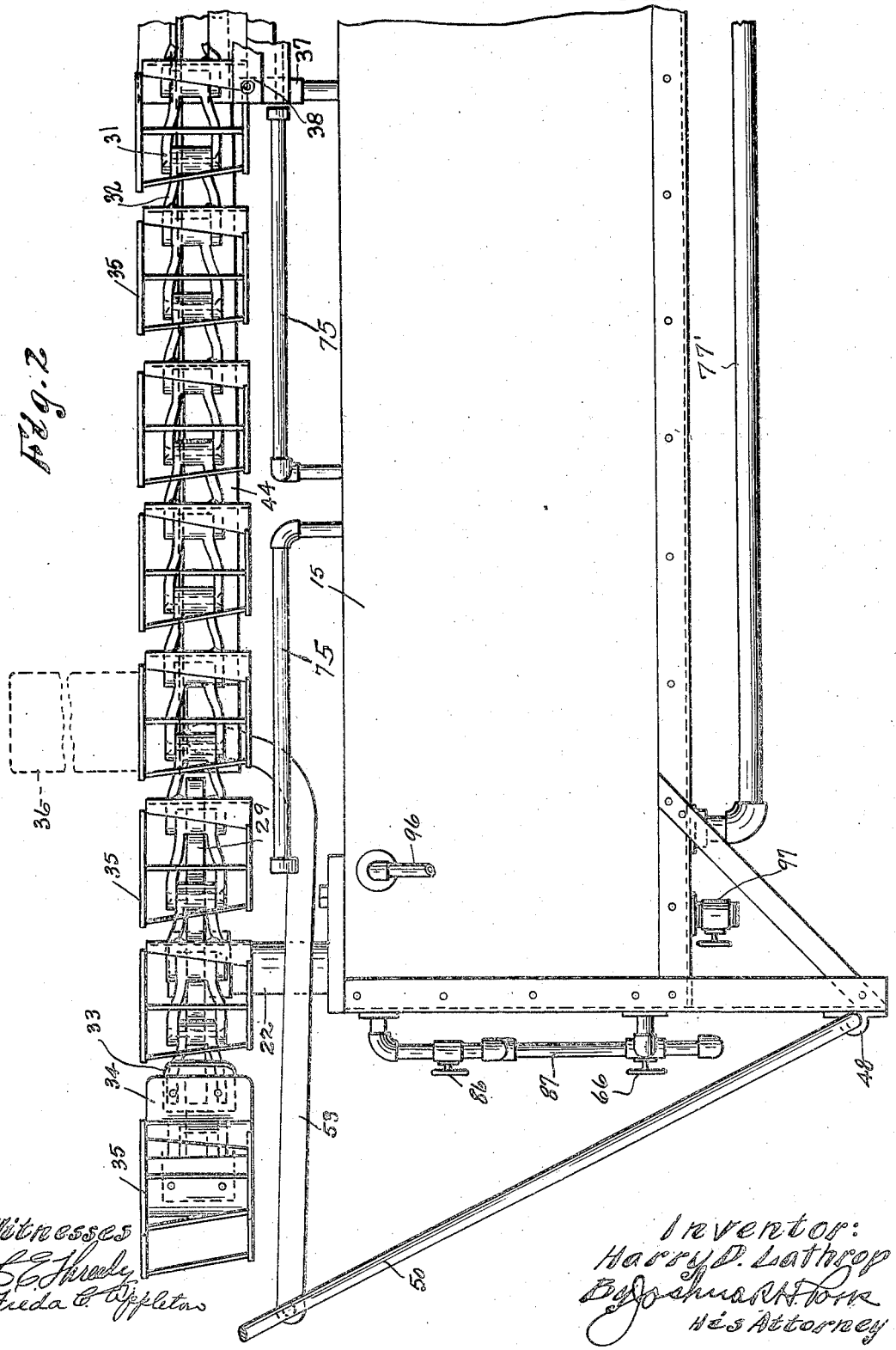
Figure 3:
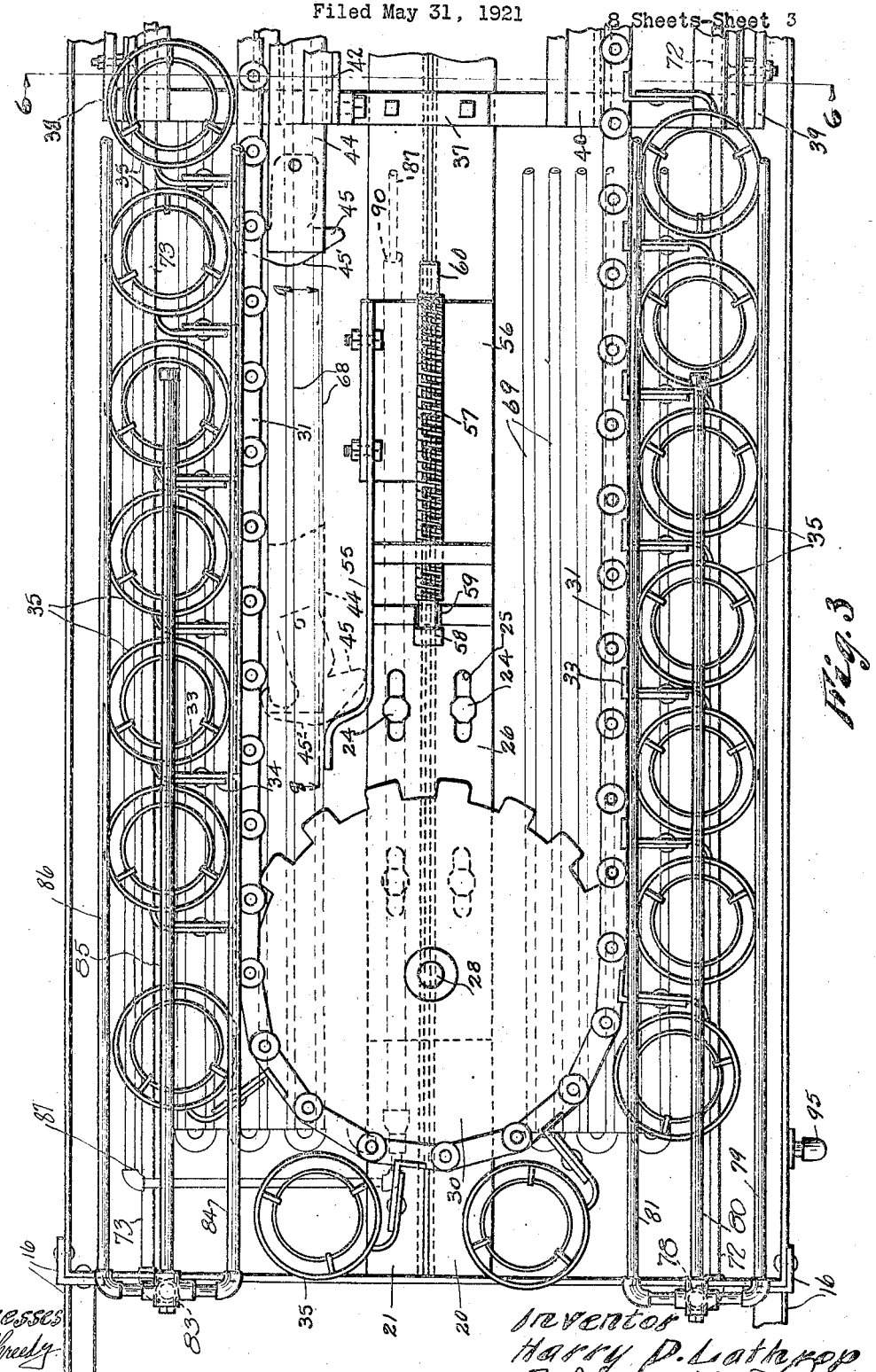
Figure 4:
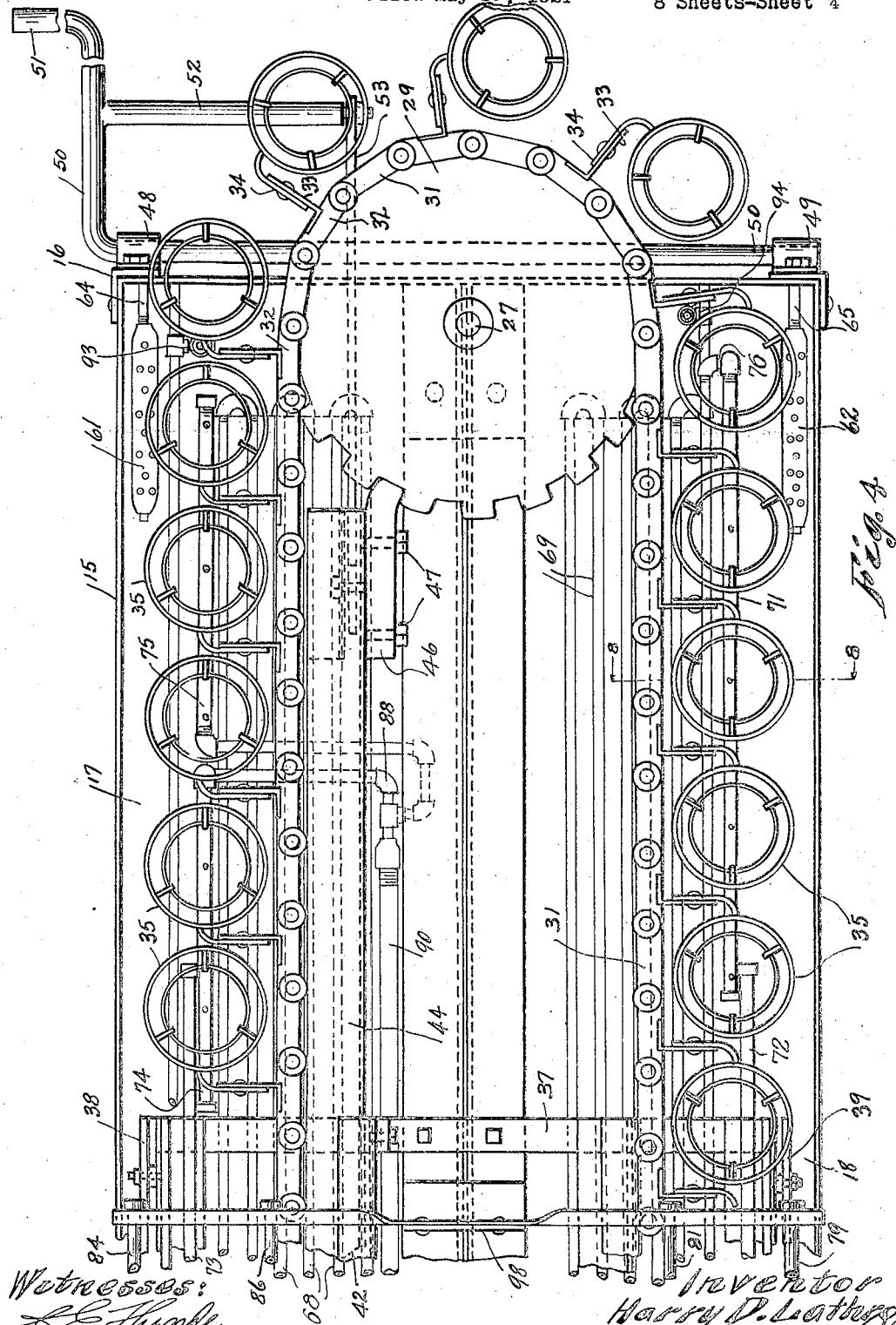
Figure 5:
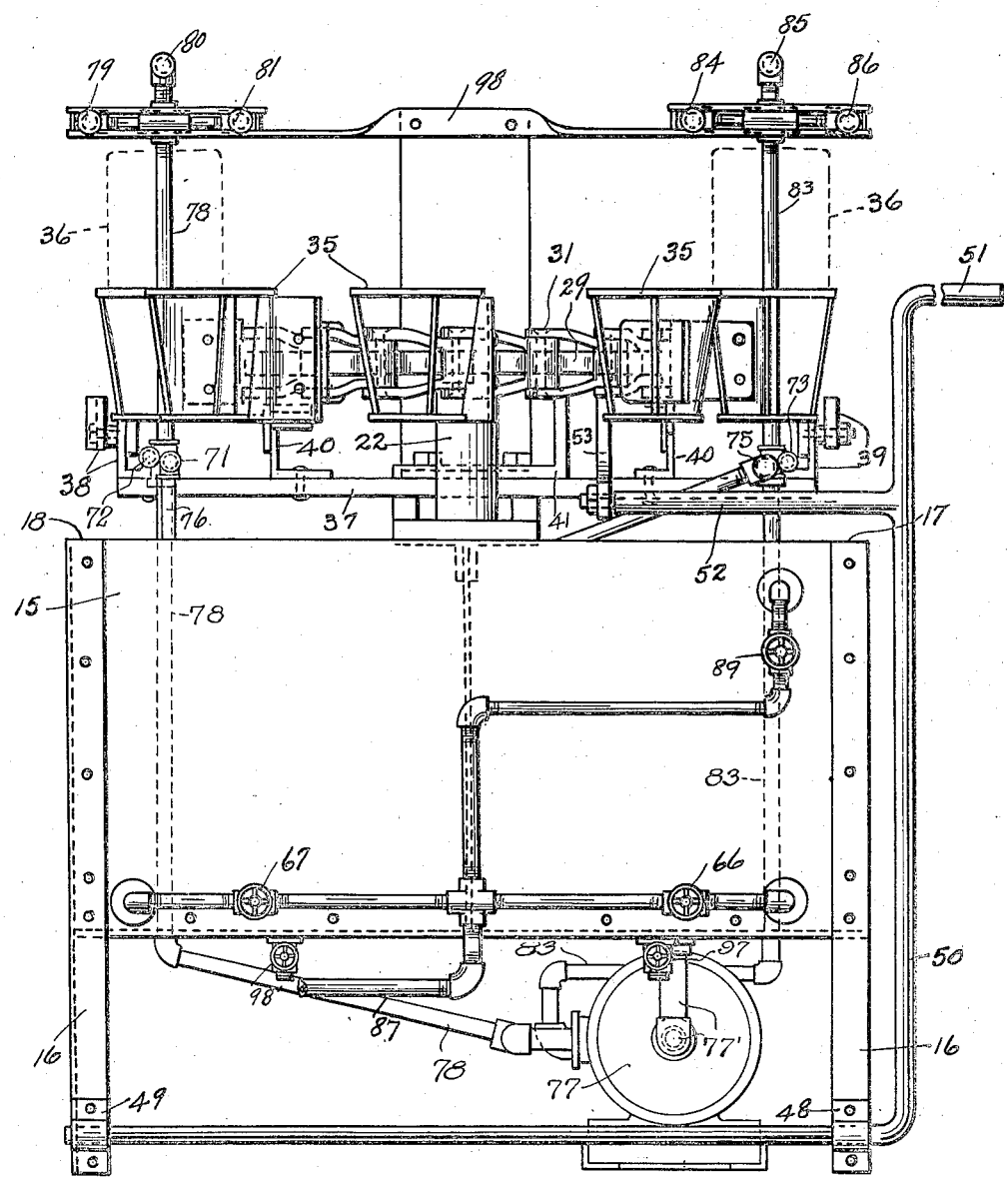
Figure 6:
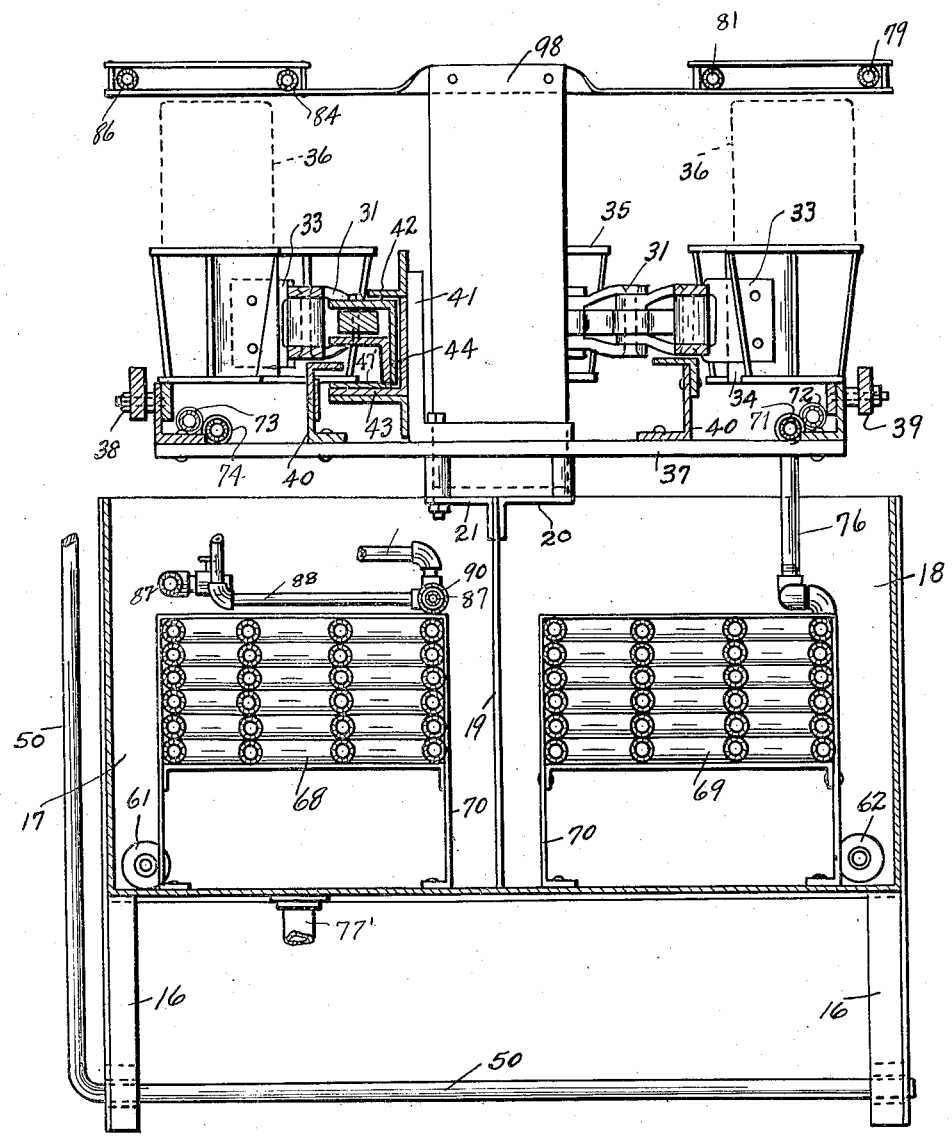

The invention will be best understood by reference to the accompanying drawings forming a part of this specification, and in which, Fig. 1 is a fragmentary side elevational view of the rear portion of the device embodying the invention, Fig. 2 is a fragmentary side elevational view of the front portion of the same, Fig. 3 is a fragmentary top plan view of the rear portion of the same, Fig. 4 is a fragmentary top plan view of the front portion of the same, Fig. 5 is an end elevational view of the receiving and discharge end of the device embodying the invention, Fig. 6 is a vertical cross sectional view taken substantially on line 6—6 of Fig. 3, Fig. 7 is a detail of the slidable bearing for rotating the conveyor embodied in the invention, Fig. 8 is a sectional detail of one of the chain links comprising a conveyor showing one of the bottle holders, embodied in the invention, mounted thereon and taken substantially on line 8—8 of Fig. 4, Fig. 9 is an elevational detail view taken substantially on line 9—9 of Fig. 3, Fig. 10 is a diagrammatical view, of one of the steam coils embodied in the invention and showing the arrangement of the pipes connected thereto and, Fig. 11 is an elevational view, partly in section, of one of the steam heaters embodied in the invention.

The preferred form of structure as illustrated in the drawings, comprises a tank 15, mounted on a supporting frame 16, and divided into two separate tanks 17 and 18 by a partition 19 positioned centrally in the said tank 15. Each of the tanks 17 and 18 contain different washing fluids preferably a soda solution and clear rinse water which is sprayed over and into bottles. Secured to the upper end of the partition 19 are angular supporting members 20 and 21 on which a stationary bearing 22 and an adjustable bearing 23 are mounted, said bearings being mounted adjacent the front and rear end of the tank 15. The adjustable bearing 23 is held rigid by bolts 24 positioned through elongated slots 25 provided in a slidable plate 26, secured to the said bearing 23, allowing the said bearing to be moved forward or backward as desired. Journalled in each of the bearings 22 and 23 are shafts 27 and 28 having sprocket gears 29 and 30 mounted thereon. Passing around the sprocket gears 29 and 30 is a continuous sprocket chain 31. Integrally formed on every other link 32 comprising the sprocket chain 31 is a laterally extending lug 33 which is rigidly fixed to a laterally extending arm 34 formed on a bottle support or holder 35, said holder serving to support a bottle 36 during its course of travel. Rigidly fixed on the angular supporting members 20 and 21 are supporting bars 37 which support angular guide members 38 and 39 which serves to support and guide the said bottle holders 35 mounted on the sprocket chain 31. Positioned opposite the angular guide members 38 and 39 are chain supporting members 40 which serve to support the sprocket chain 31. Rigidly fixed on the supporting bars 37 is an angular member or support 41 positioned adjacent the inner side of the sprocket chain 31. Mounted on the member 41 are angular guide members 42 and 43 on which an angular slidable bar 44 is positioned. The guide members 42 and 43 form a raceway for the said slidable bar 44. Pivotally mounted adjacent the forward end of the slidable bar 44 is a dog 45 adapted to engage the sprocket chain 31 when the said slidable bar 44 is operated, thus providing an intermittent movement of the sprocket chain or bottle conveyor 31. The other end of the slidable bar 44 is provided with a dog 46 which engages the sprocket gear 29, when the said bar is in its extreme rearward position, preventing the rotation of the said gear 29. The said dog 46 is held rigid on the slidable bar 44 by bolts 47. The dog 45 is provided with a cam surface 45' and when the slidable bar 44 is forced forward the sprocket chain 31 engages the cam surface 45' and forces the dog 45 out of engagement with the said sprocket chain 31. An angular member 47' is rigidly fixed to the lower guide member 43 mounted on the support 41 and serves as a stop and a guide member preventing the slidable bar 44 from being pulled back too far or out of position, this angular member 47' also serves as a positive stop for the slidable bar 44. Mounted on the supporting member 16 are bearings 48 and 49 having a lever 50 journalled therein, said lever provided with a handle 51 and a laterally extending arm 52. Connected to the outer end of the laterally extending arm 52 is a connecting link 53 which is connected to the slidable bar 44 by a bolt 54. By a movement of the lever 50 the slidable bar 44 is forced forward and backward. By a forward movement of the slidable bar 44 the dog 45 is forced into engagement with the sprocket chain 31 by a leaf spring 55 formed of spring steel or the like and mounted on an adjustable plate 56. The plate 56 is held in position by a threaded bolt 57 provided with a shoulder 58 and positioned in a slot 59 provided on an adjustable bearing plate 26. By turning the head 60 of the bolt 57 the plate 56 can be moved forward or backward as the case may require. Positioned in each of the tanks 17 and 18 are steam heaters 61 and 62 comprising a perforated tubular member 63 into which steam is admitted through steam pipes 64 and 65, the steam passing through said pipes being controlled by hand valves 66 and 67. The steam passing through the perforations provided in the tubular members 63 serves to heat the water contained in the said tanks. Water coils 68 and 69 are positioned in each of the tanks 17 and 18, supported by a supporting frame 70, and through which cold water passes. The coils 68 and 69 are so positioned in the said tanks that the fluid contained in the tanks completely covers the said coils and as the cold water passes through the coils the water is heated by the hot water contained in the tank which is heated by steam heaters 61 and 62. Located adjacent the bottom of the bottle holders 35 are a number of horizontal perforated pipes 71, 72, 73, 74 and 75. The perforated pipe 71 is connected to the water coil 69 by pipe 76 and discharges hot water into the bottles 38 as they pass over the perforations provided in the said pipe 71, thereby washing the inside of the said bottles. The perforated pipe 72 is connected to a suitable pump 77 by a pipe 78. The said pump 77 is connected by a pipe 77' to the tank 18 and pumps the soda solution contained therein through the pipes 78 and 72 into the bottles 35 as they pass over the perforations provided in the said pipe 72. The top and sides of the bottles 35 are also sprayed with a soda solution by perforated pipes 79, 80, 81 which are connected to the pipe 78, and positioned above the bottle holders 35 so as to spray the top and sides of the said bottles as the same pass under the pipes 79, 80 and 81. The pipe 73 is also connected to a suitable pump 82 by a pipe 83 said pump connected to the tank 17 and forces clear hot water, which is heated by the steam heater 61, through the perforations provided in the said pipe into the bottles 36. The top and sides of the bottles are also sprayed with hot rinse water by perforated pipes 84, 85 and 86 which are connected to the pipe 83. The pipe 74 is connected to a steam pipe 87 by a pipe 88 and sprays steam into the bottles as they pass over the perforations provided in said pipe 74. The said steam pipe 87 is controlled by a suitable hand valve 89. The steam pipe 87 passes through a pipe 90 larger in diameter than the said pipe 87, said pipe 90 being connected to the water coil 68 by a pipe 91 through which hot water passes. As the hot water passes through the pipe 91 into the pipe 90, the water is heated to a greater degree by steam which passes through the pipe 87 passing through the pipe 90. The water thus heated is carried to pipe 75 where it is discharged into the bottles through the perforations formed in the pipe. Valves 93 and 94 are connected to the water coils 68 and 69 and serve to directly fill the tank the desired capacity of water required without first flowing through the coils 68 and 69 and then into the said tanks. The perforated pipes 79, 80, 81, 84, 85 and 86 are supported by a frame 98 mounted on the angular supporting members 20 and 21. Suitable overflow pipes 95 and 96 are provided on the tanks 17 and 18 arranged to drain off the water should the tank become too full. Drain pipes 97 and 98', controlled by suitable hand valves are connected to the tanks permitting the tank to be drained when desired or when it is desired to wash the tanks 17 and 18.

In operation the bottles 36 are positioned in a number of the bottle holders 35, which are nearest the front end or receiving and discharge end of the machine and the lever 50 is swung into its extreme forward position causing the dog 45 to engage the leaf spring 55 which throws the dog 45 into engagement with the sprocket chain 31. The said lever 50 is then swung into its extreme rearward position intermittently rotating the sprocket chain 31 bringing the next set of bottle holders into position within reach of the operator, where bottles are then positioned in the bottle holders 35. By repeating this operation the sprocket chain or bottle conveyor 31 is manually intermittently rotated, by a rearward movement of the slidable bar 44, bringing a number of the bottle holders within reach of the operator where the washed bottles are removed and bottles to be washed are placed in the said bottle holders. During the travel of the bottles 36 they are first sprayed inside with hot water discharged from the pipe 71. The bottles are then conveyed over and under the pipes 72, 79, 80 and 81 where the top inside and outside of the bottles are sprayed with a soda solution which is forced up through the pipe 78 by the pump 77 which is connected to the tank 18. The bottles are next conveyed under and over the pipes 73, 84, 85, and 86 where the top, inside and outside of the bottles are sprayed with clear hot water forced through the pipe 83 which is connected to the pump 82. After the bottles are sprayed with hot rinse water they are conveyed over the pipe 74 where they are sterilized with steam and then conveyed over the pipe 75 and sprayed with hot water heated by the super heater 90. This arrangement as will be readily understood, thoroughly washes the bottles as they are conveyed over the different portions of the machine, removing the milk scum or milk which has dried on the inside or outside of the bottles, before the said bottles are removed from the bottle holders 35 by the operator.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A bottle washing machine comprising a reservoir divided into two compartments each containing different washing fluids; a continuous sprocket chain mounted to travel in a horizontal plane above said reservoir; bottle holders on said chain; means for discharging washing fluid from said reservoir over said bottles; and slidably mounted means for intermittently moving said sprocket chain, substantially as described.

2. A washing machine of the class described comprising a reservoir; a partition mounted in said reservoir dividing said reservoir into two tanks; a supporting member mounted on the upper end of said partition; a bottle conveyor mounted on said supporting member; means for washing the surfaces of bottles carried on said bottle conveyor; and means for manually intermittently moving said bottle conveyor, substantially as described.

3. A washing machine of the class described comprising a reservoir; a partition mounted in said reservoir dividing the said reservoir into two tanks, each of said tanks containing different washing fluids; a supporting member mounted on the upper end of said partition; a bottle conveyor mounted on said supporting member; means for discharging washing fluid from said tanks against the surfaces of bottles carried on said bottle conveyor; means for forcing said washing fluid through said discharging means; and means for manually intermittently moving said bottle conveyor, substantially as described.

4. A washing machine of the class described comprising a reservoir; a partition mounted in said reservoir dividing the said reservoir into two tanks, each of said tanks containing different washing fluids; a supporting member mounted on the upper end of said partition; a bottle conveyor mounted on said supporting member; means for discharging washing fluid from said tanks against the surfaces of bottles carried on said bottle conveyor; means for forcing said washing fluid through said discharging means; means positioned in each of said tanks for heating said washing fluid contained therein; and means for manually intermittently moving said bottle conveyor, substantially as described.

5. A washing machine of the class described comprising a reservoir; a partition centrally positioned in said reservoir dividing the said reservoir into two tanks, each of said tanks containing different washing fluids; steam heaters positioned in each of said tanks for heating the said washing fluid contained therein; a bottle conveyor mounted on said partition; means for washing the surfaces of bottles carried on said bottle conveyor; and means for manually intermittently moving said bottle conveyor, substantially as described.

6. A washing machine of the class described comprising a reservoir; a partition centrally positioned in said reservoir dividing the said reservoir into two tanks, each of said tanks containing different washing fluids; steam heaters positioned in each of said tanks for heating the said washing fluid; a bottle conveyor mounted on said partition; pipes arranged adjacent said conveyor for discharging washing fluid from said tanks against bottles carried thereon; means for forcing said washing fluid through said pipes; means for manually intermittently moving said bottle conveyor, substantially as described.

7. A washing machine of the class described comprising a reservoir; a partition centrally located in said reservoir dividing the said reservoir into two tanks containing different washing fluids; tubular steam heaters positioned in said tanks for heating the fluid contained therein; pipes having perforations therein positioned adjacent the bottom of said bottle conveyor for washing bottles carried on said bottle conveyor; and means for manually intermittently moving said bottle conveyor through said washing fluid discharged from said pipes, substantially as described.

8. A washing machine of the class described comprising in combination with a reservoir and a bottle conveyor thereabove, a partition centrally positioned in said reservoir dividing the said reservoir into two tanks containing different washing fluids; tubular steam heaters positioned in said tanks for heating the fluid contained therein; pipes having perforations therein positioned adjacent the bottom of said bottle conveyor for washing bottles carried on said bottle conveyor; means for manually intermittently moving said bottle conveyor through said washing fluid discharged from said pipe; and means for preventing the movements of said bottle conveyor at the completion of an operative stroke of said moving means, substantially as described.

9. A device of the class described comprising a reservoir; a partition centrally positioned in said reservoir dividing the said reservoir into two tanks, each of said tanks containing different washing fluids; angular supporting members mounted on said partition; a bottle conveyor mounted on said supporting members; means for adjusting said bottle conveyor; pipes having perforations therein located adjacent the bottom of said bottle conveyor arranged to discharge washing fluid into bottles carried on said bottle conveyor; means positioned in said tank for heating the washing fluid discharged from said pipes; and means for manually intermittently moving said bottle conveyor over said pipes, substantially as described.

10. A device of the class described, comprising a reservoir; a partition centrally positioned in said reservoir dividing the said reservoir into two tanks, each of said tanks containing different washing fluids; angular supporting members mounted on said partition; a bottle conveyor mounted on said supporting members; means mounted on said supporting members for adjusting said bottle conveyor; pipes having perforations therein positioned adjacent the top and bottom of said bottle conveyor arranged to discharge washing fluid into and over the surfaces of bottles carried on said bottle conveyor; means positioned in said tank for heating the washing fluid discharged from said pipes; and means for manually intermittently moving said bottle conveyor through said washing fluid discharged from said pipes, substantially as described.

11. A device of the class described comprising a manually intermittently operated bottle conveyor; a reservoir divided into two tanks, each of said tanks containing different washing fluids; water coils positioned in each of said tanks; pipes associated with said coils and arranged in the path of the travel of said conveyor for discharging rinsing fluid against the surfaces of bottles carried on said bottle conveyor; perforated pipes positioned over said bottle conveyor arranged to discharge washing fluid, contained in said tanks over said bottles; and means for forcing said washing fluid contained in said tank through said perforations positioned over said bottle conveyor; a perforated pipe positioned adjacent the bottom of said bottle conveyor arranged to discharge steam into said bottles; and tubular steam heaters positioned in each of said tanks for heating the washing fluid contained therein and for heating the rinsing fluid passing through said water coils to be discharged from said perforated pipes, substantially as described.

12. A device of the class described comprising a reservoir mounted on a supporting frame; a partition centrally positioned in said reservoir dividing the said reservoir into two tanks containing different washing fluids, a bottle conveyor mounted on said partition; a manually operated slidable driving member mounted on said partition; means pivotally mounted on the forward end of said driving member adapted to engage the said bottle conveyor for intermittently moving the same; perforated pipes positioned adjacent the said bottle conveyor adapted to washing the surfaces of bottles carried on said bottle conveyor; and heaters positioned in said tanks for heating the washing fluid discharged from said pipes, substantially as described.

13. A device of the class described comprising a reservoir mounted on a supporting frame; a partition centrally positioned in said reservoir dividing the said reservoir into two tanks, containing different washing fluids; a bottle conveyor mounted on said partition; a manually operated slidable driving member mounted on said partition; means pivotally mounted on the forward end of said driving member adapted to engage the said bottle conveyor for intermittently moving the same; means mounted on said driving member for stopping the movement of said bottle conveyor upon the completion of an operative stroke of said driving member; perforated pipes positioned adjacent said bottle conveyor adapted to wash the surfaces of bottles carried on said bottle conveyor; and steam heaters positioned in said tanks for heating the washing fluid contained therein to be discharged from said pipes, substantially as described.

14. A device of the class described comprising a reservoir; a partition positioned in said reservoir dividing said reservoir into two tanks, each containing different washing fluids; a bottle conveyor mounted above said reservoir; a slidably mounted drive member on said partition; means pivotally mounted at one end of said drive member adapted to engage said bottle conveyor for intermittently moving the same; adjustable means on said partition for forcing said pivotally mounted means into engagement with said conveyor; means mounted on said drive member for stopping the movement of said conveyor upon the completion of an operative stroke of said drive member; pipes associated with said tanks and arranged adjacent said conveyor for washing bottles carried therein; and tubular steam members positioned in said tanks for heating the washing fluid contained therein to be discharged from said pipes.

15. A device of the class described comprising a reservoir mounted on a supporting frame; a partition centrally positioned in said reservoir dividing the said reservoir into two tanks containing different washing fluids; a bottle conveyor mounted on said partition; a manually operated slidable driving member mounted on said partition; a dog having a cam surface pivotally mounted on the forward end of said driving member adapted to be thrown into and out of engagement with said bottle conveyor for intermittently moving the same; a stop mounted on the rear end of said driving member arranged to stop the movement of said bottle conveyor upon the completion of an operative stroke of said driving member; perforated pipes positioned under and over said bottle conveyor adapted to wash the surfaces of bottles carried on said bottle conveyor; and tubular steam heaters positioned in said tank for heating the washing fluid contained therein to be discharged from said pipes, substantially as described.

16. A washing machine of the class described comprising a continuous bottle conveyor; a reservoir divided into two tanks containing different washing fluids; water coils positioned in said tanks and pipes associated with said coils and arranged adjacent said conveyors adapted to discharge rinse water into bottles carried on said conveyor; a power driven pump connected to said tank for forcing washing fluid through perforated pipes positioned over and under said bottle conveyor, said pipes discharging said washing fluid into and over said bottles; a driving member mounted adjacent said bottle conveyor and extending parallel therewith; and means pivotally mounted on said driving member adapted to be thrown into and out of engagement with the said bottle conveyor for intermittently moving the same through said washing fluids, substantially as described.

17. A device of the class described comprising a reservoir; a partition in said reservoir dividing the said reservoir into two tanks containing different washing fluids; supporting members mounted on said partition; an adjustable bearing mounted on said supporting members; a stationary bearing mounted on said supporting members in axial alignment with said adjustable bearing; a sprocket gear mounted on each of said bearings; a continuous sprocket chain passing around said sprocket gears; bottle holders mounted on said sprocket chain; a driving member mounted on said supporting members; means pivotally mounted on one end of said driving member adapted to be thrown into and out of engagement with said sprocket chain for intermittently moving said sprocket chain; and a plurality of perforated pipes located over different portions of the said reservoir and positioned under and over said bottle holders arranged to discharge different washing fluids over surfaces of bottles positioned in said bottle holders, substantially as described.

18. A device of the class described comprising a reservoir; a partition in said reservoir dividing the said reservoir into two tanks containing different washing fluids; supporting members mounted on said partition; an adjustable bearing mounted on said supporting members, a stationary bearing mounted on said supporting members in axial alignment with said adjustable bearing; a sprocket gear mounted on each of said bearings; a continuous sprocket chain passing around said sprocket gears; bottle holders mounted on said sprocket chain; a driving member mounted on said supporting members; a dog having a cam surface pivotally mounted on the forward end of said driving member; a leaf spring adjustably mounted on said supporting member arranged to engage the said cam surface of said dog throwing the said dog into engagement with the said sprocket chain intermittently moving the same; a stop member mounted on one end of said driving member adapted to engage one of the sprocket gears upon the completion of an operative stroke of said driving member to prevent further rotation of said gear; and a plurality of perforated pipes located over different portions of the said reservoir and positioned over and under said bottle holders arranged to discharge different washing fluids over surfaces of bottles positioned in said bottle holders, substantially as described.

19. In a bottle washing machine, the combination with a reservoir, of a chain member mounted to travel above said reservoir; bottle holders carried by said chain member; pipes in communication with said reservoir and provided with perforated horizontal portions arranged under and above said bottle holders for directing washing fluid from said reservoir over and into bottles carried by said holders, said washing fluid discharged from said pipes being adapted to drain back into said reservoir; and means for forcing the washing fluid from said reservoir through said pipes; a manually operated slidably mounted drive member; and means carried by said drive member adapted to engage said chain member for intermittently moving said chain member, substantially as described.

20. In a bottle washing machine, the combination with a reservoir, of a chain member mounted to travel above said reservoir; bottle holders carried by said chain member; pipes in communication with said reservoir and provided with perforated horizontal portions arranged under and above said bottle holders for directing washing fluid from said reservoir over and into bottles carried by said holders, said washing fluid discharged from said pipes being adapted to drain back into said reservoir; and means for forcing the washing fluid from said reservoir through said pipes; a manually operated slidably mounted drive member; means carried by said drive member adapted to engage said chain member for intermittently moving said chain member, and means for throwing said moving means into engagement with said chain member, substantially as described.

21. In a bottle washing machine, the combination with a reservoir, of a chain member mounted to travel above said reservoir; bottle holders carried by said chain member; pipes in communication with said reservoir and provided with perforated horizontal portions arranged under and above said bottle holders for directing washing fluid from said reservoir over and into bottles carried by said holders, said washing fluid discharged from said pipes being adapted to drain back into said reservoir; and means for forcing the washing fluid from said reservoir through said pipes; a manually operated slidably mounted drive member; and a chain engaging member pivotally mounted on said drive member adapted to engage said chain member for intermittently moving said chain member, said engaging member being provided with a cam surface adapted to engage one of the links of said chain member for disengaging said chain engaging member from said chain member, substantially as described.

22. In a bottle washing machine, the combination with a reservoir, of a chain member mounted to travel above said reservoir; bottle holders carried by said chain member; pipes in communication with said reservoir and provided with perforated horizontal portions arranged under and above said bottle holders for directing washing fluid from said reservoir over and into bottles carried by said holders, said washing fluid discharged from said pipes being adapted to drain back into said reservoir; and means for forcing the washing fluid from said reservoir through said pipes; a manually operated slidably mounted drive member; means carried by said drive member adapted to engage said chain member for intermittently moving said chain member, means for throwing said moving means into engagement with said chain member, and a pawl carried by said drive member whereby the movement of said chain member is stopped upon the completion of an operative stroke of said drive member, substantially as described.

23. In a bottle washing machine, the combination with a reservoir, of a chain member mounted to travel above said reservoir; bottle holders carried by said chain member; pipes in communication with said reservoir and provided with perforated horizontal portions arranged under and above said bottle holders for directing washing fluid from said reservoir over and into bottles carried by said holders, said washing fluid discharged from said pipes being adapted to drain back into said reservoir; and means for forcing the washing fluid from said reservoir through said pipes; a manually operated slidably mounted drive member; and a chain engaging member pivotally mounted on said drive member adapted to engage said chain member for intermittently moving said chain member, said engaging member being provided with a cam surface adapted to engage one of the links of said chain member for disengaging said chain engaging member from said chain member; and means for forcing said chain engaging member into engagement with said chain member, substantially as described.

In testimony whereof I have signed my name to this specification.

HARRY D. LATHROP.